United States Patent
Roshan

(10) Patent No.: US 12,546,251 B2
(45) Date of Patent: Feb. 10, 2026

(54) SELF-PRESSURIZED AMMONIA FUEL SUPPLY SYSTEMS AND METHODS FOR GAS TURBINE ENGINES

(71) Applicant: GE Infrastructure Technology LLC, Greenville, SC (US)

(72) Inventor: Dinesh Roshan, Karnataka (IN)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/037,587

(22) Filed: Jan. 27, 2025

(65) Prior Publication Data
US 2025/0243807 A1 Jul. 31, 2025

(30) Foreign Application Priority Data
Jan. 30, 2024 (IN) .............................. 202411006092

(51) Int. Cl.
*F02C 6/18* (2006.01)
*F02C 7/22* (2006.01)
*F23R 3/28* (2006.01)

(52) U.S. Cl.
CPC .................. *F02C 6/18* (2013.01); *F02C 7/22* (2013.01); *F23R 3/28* (2013.01)

(58) Field of Classification Search
CPC .... F02C 7/22; F02C 7/224; F02C 6/18; F02C 3/20; F02C 3/24; F02C 3/22; F23R 3/28
See application file for complete search history.

(56) References Cited

U.S. PATENT DOCUMENTS

2011/0011354 A1* 1/2011 Dincer ................... C01B 3/047
123/3
2023/0407784 A1* 12/2023 Takeishi .................. F02C 7/236

FOREIGN PATENT DOCUMENTS

AU 2022312781 A1 11/2023
GB 766207 A 1/1957
WO WO-2024132218 A1 * 6/2024 ............. C01B 3/047

OTHER PUBLICATIONS

European Extended Search Report issued in patent application Serial No. 25150468.4 dated Jun. 20, 2025, pp. 1-7.

* cited by examiner

*Primary Examiner* — Andrew H Nguyen
(74) *Attorney, Agent, or Firm* — Armstrong Teasdale LLP

(57) ABSTRACT

A power generation system includes a rotary machine including a combustor, and a fuel supply system configured to supply a liquid ammonia fuel to the combustor. The fuel supply system includes a fuel supply line coupled to the combustor, a supply tank disposed on the fuel supply line upstream from the combustor, the supply tank being sized to receive the liquid ammonia fuel therein, and a heat exchanger configured to heat the liquid ammonia fuel in the supply tank such that an ammonia vapor pressure in the supply tank is sufficient to drive the liquid ammonia fuel from the supply tank towards the combustor.

20 Claims, 5 Drawing Sheets

SELF-PRESSURIZED AMMONIA FUEL SUPPLY SYSTEMS AND METHODS FOR GAS TURBINE ENGINES

CROSS-REFERENCE TO RELATED APPLICATIONS

This application claims priority pursuant to 35 U.S.C. 119(a) to Indian Patent Application No. 202411006092, filed Jan. 30, 2024, which application is incorporated herein by reference in its entirety.

TECHNICAL FIELD

The field relates generally to gas turbine engines and, more particularly, to systems and methods for supplying an ammonia fuel to a gas turbine engine.

BACKGROUND

Gas turbine engines are widely used in industrial and power generation operations. A conventional gas turbine engine includes a compressor, one or more combustors downstream from the compressor, and a turbine (e.g., an expansion turbine) downstream from the combustor(s). A working fluid, such as ambient air, flows into the compressor where it is compressed before passing into the combustor. The compressed working fluid is mixed with a fuel and burned within the combustor to generate combustion gases, which expand through the turbine to rotate a shaft producing electricity.

Combustion gases may include various combustion by-products, such as nitrogen oxides ($NO_x$), carbon monoxide (CO), and unburned hydrocarbons. Lowering such emissions may be difficult as reducing working temperatures and available oxygen during combustion, to reduce the production of $NO_x$, may increase the levels of CO and unburned hydrocarbons. Recent efforts to further lower such emissions include the use of ammonia as combustion fuel source. Ammonia-based fuels are advantageous in that they do not produce carbon-based emissions when burned.

The use of ammonia-based fuels in combustion engines, such as gas turbine engines, introduces several technical challenges. For example, fuel pumps that are commonly used to supply fuel to the combustor section may not be suitable for supplying ammonia fuel to the combustor section. Ammonia has a relatively high vapor pressure and the mechanical action performed by the fuel pump may generate gaseous ammonia bubbles in the liquid ammonia fuel stream. Gaseous ammonia entrained in the liquid ammonia fuel stream may negatively affect flame propagation and/or cause undesirable combustion dynamics in the combustor section. Ammonia is also a corrosive chemical, and its use as a fuel may significantly increase equipment and material costs because it requires the fuel supply components (e.g., the fuel pump) to be made with corrosive resistant materials that are compatible with ammonia to maintain the lifetime expectancy of the components. Thus, challenges remain in integrating ammonia fuel into combustion engines.

Accordingly, there exists a need for systems and methods that facilitate the use of ammonia fuel in gas turbine engines and address the above-described challenges.

BRIEF DESCRIPTION

In one aspect, a power generation system is provided. The power generation system includes a rotary machine including a combustor, and a fuel supply system configured to supply a liquid ammonia fuel to the combustor. The fuel supply system includes a fuel supply line coupled to the combustor, a supply tank disposed on the fuel supply line upstream from the combustor, wherein the supply tank is sized to receive the liquid ammonia fuel therein, and a heat exchanger configured to heat the liquid ammonia fuel in the supply tank such that an ammonia vapor pressure in the supply tank is sufficient to drive the liquid ammonia fuel from the supply tank towards the combustor.

In another aspect, a combined cycle power plant is provided. The combined cycle power plant includes a gas turbine engine comprising a combustor, a heat recovery steam generator (HRSG) coupled to the gas turbine engine, and a fuel supply system configured to supply a liquid ammonia fuel to the gas turbine engine. The fuel supply system includes a fuel supply line coupled to the gas turbine engine, a supply tank disposed on the fuel supply line upstream from the gas turbine engine, wherein the supply tank is sized to receive the liquid ammonia fuel therein, and a heat exchanger configured to heat the liquid ammonia fuel in the supply tank such that an ammonia vapor pressure in the supply tank is sufficient to drive the liquid ammonia fuel from the supply tank towards the gas turbine engine, wherein the heat exchanger is configured to use steam generated by the HRSG to heat the liquid ammonia fuel in the supply tank.

In another aspect, a method of supplying a liquid ammonia fuel to a rotary machine is provided. The method includes channeling the liquid ammonia fuel into a supply tank; heating the liquid ammonia fuel in the supply tank to thereby increase an ammonia vapor pressure in the supply tank; and driving the liquid ammonia fuel from the supply tank towards a combustor of the rotary machine using the ammonia vapor pressure in the supply tank.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
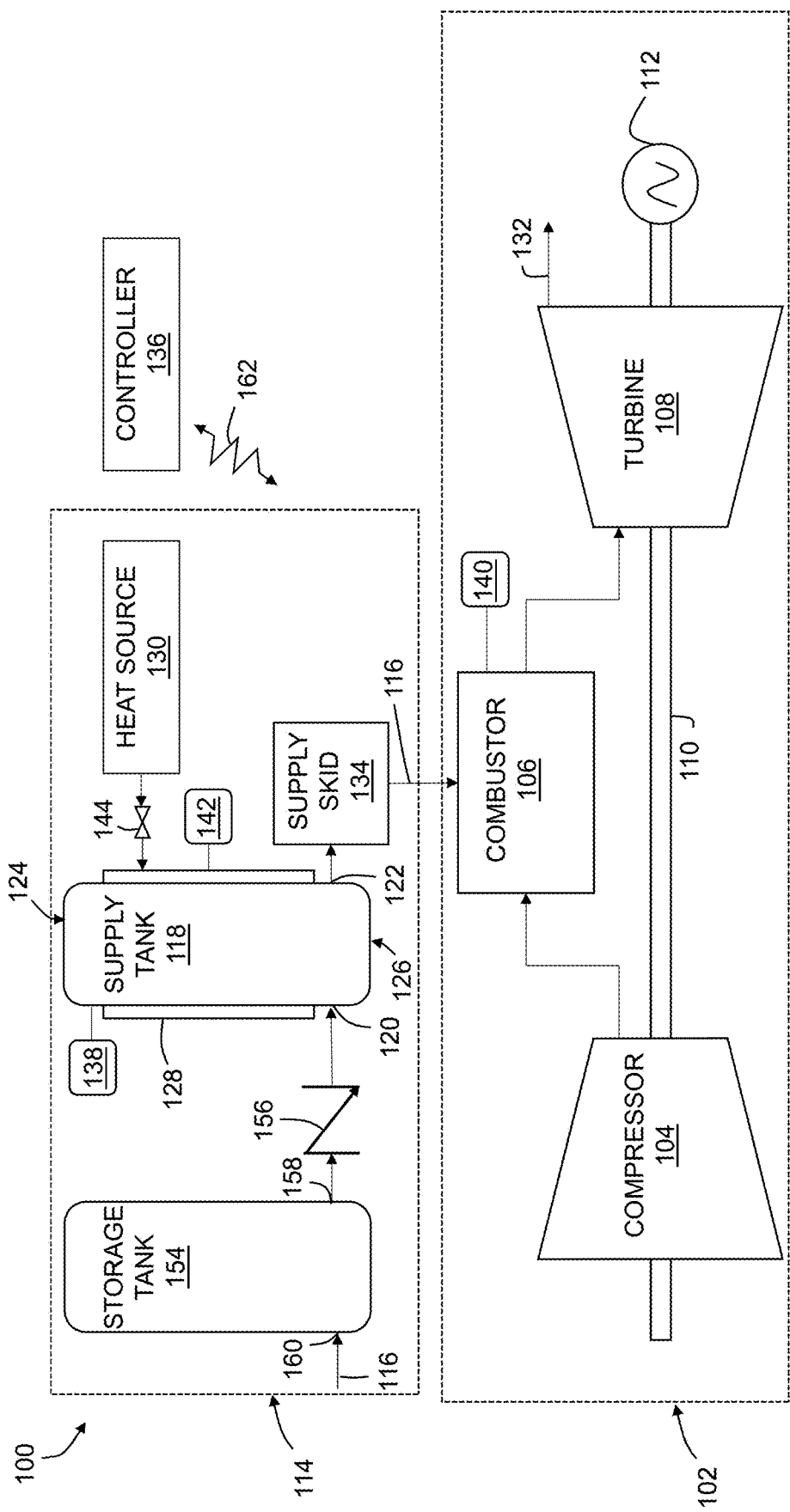
FIG. 1 is a schematic illustration of a power generation system including an exemplary fuel supply system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The embodiments described herein relate to systems and methods for supplying a liquid ammonia fuel to a combustor of a rotary machine (e.g., a gas turbine engine). An exemplary fuel supply system configured to supply the liquid ammonia fuel to the combustor includes a fuel supply line coupled to the combustor, a supply tank disposed on the fuel supply line upstream from the combustor and sized to receive the liquid ammonia fuel therein, and a heat exchanger configured to heat the liquid ammonia fuel in the supply tank. Heating the liquid ammonia fuel increases the ammonia vapor pressure in the supply tank, causing the liquid ammonia fuel to partially vaporize and equilibrate in a two-phase mixture of liquid and vaporized ammonia in the supply tank. The liquid ammonia fuel is heated in the supply tank to increase the ammonia vapor pressure in the supply tank to a pressure that exceeds the operating pressure in the combustor. The pressure differential between the supply tank and the combustor drives the liquid ammonia fuel from the supply tank towards the combustor. Thus, the liquid ammonia fuel may be supplied to the combustor without using a fuel pump to move the liquid ammonia fuel from the supply tank to the combustor.

The exemplary fuel supply system may also include a start-up skid disposed on the fuel supply line between the supply tank and the combustor. The start-up skid may include a start-up fuel pump configured to drive the liquid ammonia fuel to the combustor during a start-up operation while the liquid ammonia fuel in the supply tank is heated to a sufficient ammonia vapor pressure. The start-up operation may require a relatively small quantity of the liquid ammonia fuel, such that a low-capacity fuel pump may be included in the start-up skid to reduce costs and required maintenance. In an exemplary start-up skid, the start-up fuel pump is disposed on a start-up line through which the liquid ammonia fuel is initially channeled towards the combustor until the ammonia vapor pressure in the supply tank reaches a sufficient pressure to drive the liquid ammonia fuel towards the combustor without using the fuel pump. At this stage, a control valve may be operated to selectively route the liquid ammonia fuel through a bypass line of the start-up skid that bypasses the start-up fuel pump. A controller may be configured to operate the control valve based on the ammonia vapor pressure in the supply tank. For example, the controller may operate the control valve based on a measured pressure in the supply tank and/or based on a determined pressure differential between the supply tank and the combustor. In some embodiments, the control valve may be metered to progressively increase flow of the liquid ammonia fuel in the bypass line while concurrently reducing flow of the liquid ammonia fuel in the start-up line as the ammonia vapor pressure in the supply tank increases.

In an exemplary embodiment, the heat exchanger is a heating jacket of the supply tank that circulates a heat exchange fluid for heating the liquid ammonia fuel in the supply tank via conductive or convective heating. The heat exchange fluid may be drawn from any suitable heat source. In some embodiments, the heat exchange fluid is hot exhaust gases that are generated by a turbine of the rotary machine and that are recirculated to the heat exchanger via an exhaust gas recirculation system. In other embodiments, the heat transfer fluid is steam generated by a heat recovery steam generator coupled to the rotary machine. The steam may be drawn immediately downstream from the heat recovery steam generator or may be drawn downstream from a steam turbine coupled to the heat recovery steam generator.

In an exemplary embodiment, the fuel supply system also includes a storage tank disposed on the fuel supply line upstream from the supply tank. The storage tank is sized to receive the liquid ammonia fuel therein. Liquid ammonia fuel may be maintained at a lower temperature and pressure in the storage tank relative to a temperature and pressure in the supply tank such that the liquid ammonia fuel does not substantially vaporize in the storage tank. As the liquid ammonia fuel in the supply tank is driven towards the combustor, the liquid ammonia fuel in the storage tank is channeled towards the supply tank to replenish a volume of the liquid ammonia fuel in the supply tank. The replenished liquid ammonia fuel in the supply tank maintains the ammonia vapor pressure equilibrium in the storage tank. Thus, the storage tank facilitates maintaining a continuous flow of the liquid ammonia fuel being driven towards the combustor using the ammonia vapor pressure in the supply tank. In some embodiments, a non-return valve may be disposed between the storage tank and the supply tank to facilitate preventing backflow of the liquid ammonia fuel from the supply tank to the storage tank.

The exemplary embodiments described herein facilitate using ammonia as a combustion fuel in a rotary machine while overcoming several technical challenges associated with ammonia fuel. Ammonia is an advantageous combustion fuel since it does not produce carbon-based emissions when burned. Moreover, ammonia may provide several advantages over other "green" combustion fuels, such as hydrogen fuel. Compared to hydrogen, ammonia has 45% higher volumetric density, is safer in handling, and is significantly less expensive in terms of storage cost. However, ammonia is a relatively corrosive chemical and its integration in conventional fuel supply systems is limited and/or costly as it may require certain components of the supply system (e.g., a fuel pump) to be equipped with corrosion-resistant materials, thereby increasing capital and maintenance costs. The systems and methods described herein include the use of a self-pressurized supply tank for driving the ammonia fuel to the rotary machine, which may eliminate the need for fuel pumps to move the ammonia fuel or which may significantly reduce the required capacity of such fuel pumps (e.g., low-capacity fuel pumps may only be needed during a start-up operation). The self-pressurized supply tanks also facilitate reducing or eliminating the propensity for gaseous ammonia to become entrained in the liquid ammonia fuel supplied to the combustor, which otherwise may negatively affect flame propagation and/or cause undesirable combustion dynamics in the combustor section. In particular, the liquid ammonia fuel in the self-pressurized tank is driven by a pressure differential towards the combustor, rather than mechanical action which has been known to generate gaseous ammonia bubbles in the liquid ammonia fuel stream. Accordingly, the exemplary systems and methods provide significant technical advantages and facilitate using ammonia combustion fuels while reducing or eliminating the costs and other limitations that may otherwise hinder such use.

In the following specification and the claims, reference will be made to a number of terms, which shall be defined to have the following meanings.

The singular forms "a," "an," "the," and "said" include plural references unless the context clearly dictates otherwise.

The terms "comprising," "including," and "having" are intended to be inclusive and mean that there may be additional elements other than the listed elements.

"Optional" or "optionally" means that the subsequently described event or circumstance may or may not occur, and that the description includes instances where the event occurs and instances where it does not.

References to "one embodiment" or "an embodiment" are not intended to be interpreted as excluding the existence of additional embodiments that also incorporate the recited features. Moreover, although specific features of various embodiments described herein may be shown in some drawings and not in others, this is for convenience only. In accordance with the principles of the present disclosure, any feature of a drawing and/or embodiment described herein may be referenced and/or claimed in combination with any feature of any other drawing and/or embodiment described herein. Furthermore, unless explicitly stated to the contrary, embodiments "including" or "having" an element or a plurality of elements having a particular property may include additional such elements not having that property.

As used herein, the term "real-time" refers to either the time of occurrence of the associated events, the time of measurement and collection of predetermined data, the time to process the data, or the time of a system response to the events and the environment. In the embodiments described herein, these activities and events occur substantially instantaneously.

As used herein, the terms "processor" and "computer" and related terms, e.g., "processing device," "computing device," and "controller" are not limited to just those integrated circuits referred to in the art as a computer, but instead refer broadly to a microcontroller, a microcomputer, a programmable logic controller (PLC), an application specific integrated circuit, and/or other programmable circuits, and such terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to only being, computer peripherals associated with an operator interface such as a mouse and a keyboard. Alternatively, other computer peripherals may also be used such as, but not limited to, a scanner. Furthermore, in the embodiments described herein, additional output channels may include, but are not limited to only being, an operator interface monitor.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Referring now to the drawings, FIG. 1 is a schematic illustration of an exemplary power generation system 100. The power generation system 100 includes a rotary machine 102 operable using a liquid ammonia fuel. In the exemplary embodiment, rotary machine 102 is a gas turbine engine 102 operable using a liquid ammonia fuel. The gas turbine engine 102 includes a compressor 104, one or more combustors 106, and a turbine 108 coupled together in a serial flow relationship. A shaft 110 extends axially and operatively couples the compressor 104 to the turbine 108. The gas turbine engine 102 may be coupled to a generator 112 via shaft 110 to produce electrical power. While the exemplary power generation system 100 of FIG. 1 includes a gas turbine engine 102, it should be noted that the power generation system 100 is not limited to any particular type of rotary machine. Any suitable rotary machine 102 operable using a liquid ammonia fuel, in any suitable configuration may be used in the power generation system 100.

In an exemplary operation of the power generation system 100, the combustor 106 receives a compressed working fluid, including an oxidant (e.g., compressed air) from the compressor 104, and the liquid ammonia fuel. The liquid ammonia fuel and the compressed working fluid are mixed and combusted in the combustor 106 to generate combustion gases. The combustion gases are channeled through the turbine 108, in which the combustion gases expand and perform work in the turbine 108, causing the shaft 110 to rotate and thus to enable the generator 112 to produce electrical power. Exhaust gases may exit the turbine 108 through an exhaust duct 132. The exhaust gases may be recirculated back to the compressor 104 or may be used, for example, in a heat recovery steam generator system (see FIG. 3) to generate steam from thermal energy extracted from the exhaust gases. Alternatively, the exhaust gases may undergo emissions control treatment (e.g., selective catalytic reduction) to remove unwanted combustion by-products (e.g., $NO_x$) from the exhaust stream.

The power generation system 100 also includes a fuel supply system 114 configured to supply the liquid ammonia fuel to the combustor 106. The fuel supply system 114 includes a fuel supply line 116 coupled to the combustor 106. The fuel supply line 116 may include conduits and/or other piping suitable to channel the liquid ammonia fuel to the combustor 106. In some embodiments, the fuel supply line 116 may be made of steel or other suitable material that is chemically compatible with the liquid ammonia fuel.

The fuel supply system 114 also includes a supply tank 118 disposed on the fuel supply line 116 upstream from the combustor 106. The supply tank 118 is sized and shaped to receive a volume of the liquid ammonia fuel therein. The dimensions of the supply tank 118 may vary depending on the capacity requirements of the power generation system 100. One supply tank 118 or more than one supply tank 118 may be included in the fuel supply system 114. In embodiments where multiple supply tanks 118 are included, the supply tanks 118 may be disposed on the fuel supply line 116 in series, in parallel, or a combination thereof. The supply tank 118 includes an inlet 120 to allow the liquid ammonia fuel to enter the supply tank 118 and an outlet 122 to allow the liquid ammonia fuel to exit the supply tank 118. The supply tank 118 may be vertically oriented and includes a top 124 and a bottom 126. Each of the inlet 120 and the outlet 122 may be defined by fittings (not shown) located proximate the bottom 126 of the supply tank 118. The fittings couple the inlet 120 and the outlet 122 of the supply tank 118 to the fuel supply line 116.

The fuel supply system 114 also includes a heat exchanger 128 configured to heat the liquid ammonia fuel in the supply tank 118. The heat exchanger 128 may be thermally connected to the supply tank 118 such that the heat exchanger 128 heats the liquid ammonia fuel via conductive or convective heating. In the example embodiment, the heat exchanger 128 is a heating jacket surrounding the supply tank 118. In other embodiments, the heat exchanger 128 may have any suitable configuration that enables the heat exchanger 128 to function as described herein (e.g., a thermal fluid-containing tank that surrounds supply tank 118).

In some embodiments, the heat exchanger 128 is coupled to a heat source 130 that supplies a heat transfer fluid (e.g., hot exhaust gases or steam) to the heat exchanger 128. In various embodiments, the heat transfer fluid may include waste heat generated by the power generation system 100. For example, the heat transfer fluid may be exhaust gases generated by the turbine 108 that exit via the exhaust duct 132 and are channeled to the heat exchanger 128 using an exhaust gas recirculation (EGR) system (e.g., the EGR system 202 shown in FIG. 2). Additionally, and/or alternatively, the heat transfer fluid may be steam generated by or downstream from a heat recovery steam generator (HRSG) coupled to the gas turbine engine 102 (e.g., the HRSG 304 shown in FIG. 3). In other embodiments, the heat transfer fluid may be any suitable heat transfer fluid that enables the heat exchanger 128 to function as described herein.

One or more heat transfer fluid flow control devices 144 may be disposed between the heat source 130 and the heat exchanger 128. The heat transfer fluid flow control device 144 may include a control valve to control flow of the heat transfer fluid supplied to the heat exchanger 128 from the heat source 130. Additional or alternative flow control means may be included as the heat transfer fluid flow control device 144. For example, the heat transfer fluid flow control device 144 may include a pump or blower controllable to adjust the flow of the heat transfer fluid supplied to the heat exchanger 128. The heat transfer fluid flow control device 144 may facilitate adjusting the amount of the heat transfer fluid supplied to the heat exchanger 128 to achieve a desired heating of the liquid ammonia fuel in the supply tank 118. The heat transfer fluid flow control device 144 may be selectively operated using operating condition feedback from sensors (e.g., pressure sensor(s) 138 and/or temperature sensor(s) 142) coupled to the supply tank 118 and/or the heat exchanger 128.

In the exemplary embodiment, the heat exchanger 128 is operable to heat the liquid ammonia fuel in the supply tank 118 such that an ammonia vapor pressure in the supply tank 118 is sufficient to drive the liquid ammonia fuel from the supply tank 118 towards the combustor 106. In particular, the heat exchanger 128 is operable to heat the liquid ammonia fuel in the supply tank 118 such that the ammonia vapor pressure in the supply tank 118 increases to a pressure that exceeds the operating pressure in the combustor 106. This creates a positive pressure differential between the supply tank 118 and the combustor 106, which drives the liquid ammonia fuel from the supply tank 118 towards the combustor 106 (e.g., without need for a high-capacity pump).

The amount of heat provided by the heat exchanger 128 may vary depending on the desired ammonia vapor pressure in the supply tank 118 and the operating pressure in the combustor 106. The amount of heat provided by the heat exchanger 128 is also determined based the temperature to which the liquid ammonia fuel must be heated to achieve the desired ammonia vapor pressure. The supply tank 118 may, in some embodiments, also include thermal insulation surrounding the supply tank 118 to insulate heat and facilitate maintaining the temperature and ammonia vapor pressure within the supply tank 118.

The temperature to which the liquid ammonia fuel is heated to achieve the desired ammonia vapor pressure may be determined based on the vapor pressure characteristics of ammonia at gas-liquid equilibrium. TABLE 1 below lists approximate ammonia vapor pressures (in bar absolute) for various temperatures (in ° C.) at gas-liquid equilibrium.

TABLE 1

| Vapor Pressure of Ammonia at Gas-Liquid Equilibrium | |
| --- | --- |
| Temperature (° C.) | Vapor-Pressure (bar absolute) |
| −5.0 | 3.55 |
| 4.4 | 5.05 |
| 10.0 | 6.15 |
| 15.6 | 7.42 |
| 25.0 | 10.0 |
| 30.0 | 11.7 |
| 35.0 | 13.5 |
| 40.0 | 15.5 |
| 45.0 | 17.8 |
| 56.9 | 24.2 |
| 76.9 | 38.7 |
| 96.9 | 58.8 |
| 117 | 86.0 |
| 127 | 103 |
| 132 | 113 |

As shown in TABLE 1, at a temperature of about 25° C., the vapor pressure of ammonia is about 10.0 bar absolute (bara). At a temperature of about 40° C., the vapor pressure of ammonia is about 15.5 bara. At a temperature of about 100° C., the vapor pressure of ammonia increases to above about 60 bara. At temperatures of equal to or greater than about 125° C., the vapor pressure of ammonia increases to above about 100 bara.

In some embodiments, the heat exchanger 128 is operable to heat the liquid ammonia fuel in the supply tank 118 to a temperature of at least about 20° C., at least about 30° C., at least about 40° C., at least about 50° C., at least about 60° C., at least about 70° C., at least about 80° C., at least about 90° C., at least about 100° C., at least about 110° C., or at least about 120° C. In various embodiments, the heat exchanger 128 is operable to heat the liquid ammonia fuel in the supply tank 118 to a temperature of between about 20° C. to about 150° C., such as between about 40° C. to about 150° C. In one exemplary embodiment, the heat exchanger 128 is operable to heat the liquid ammonia fuel in the supply tank 118 to a temperature of about 125° C. The temperature to which the liquid ammonia fuel is heated may be any suitable temperature to enable the fuel supply system 114 to function as described herein.

In some embodiments, the heat exchanger 128 is operable to heat the liquid ammonia fuel in the supply tank 118 to a suitable temperature such that an ammonia vapor pressure in the supply tank 118 is at least about 15 bara, at least about 20 bara, at least about 30 bara, at least about 40 bara, at least about 50 bara, at least about 60 bara, at least about 70 bara, at least about 80 bara, or at least about 90 bara. In various embodiments, the heat exchanger 128 is operable to heat the liquid ammonia fuel in the supply tank 118 such that an ammonia vapor pressure in the supply tank 118 is between about 15 bara to about 125 bara. In one exemplary embodiment, the heat exchanger 128 is operable to heat the liquid ammonia fuel in the supply tank 118 such that an ammonia vapor pressure in the supply tank 118 is about 100 bara. The heat exchanger 128 may be operable to heat the liquid ammonia fuel in the supply tank 118 such that the ammonia vapor pressure is any suitable pressure to enable the fuel supply system 114 to function as described herein. For example, the ammonia vapor pressure in the supply tank 118 generated by the heat exchanger 128 may be any pressure sufficient to drive the liquid ammonia fuel from the supply tank 118 towards the combustor 106. This may vary, for example, depending on the operating conditions of the power generation system 100 (e.g., an operating pressure in the combustor 106).

In some examples, the heat exchanger 128 may be operable to heat the liquid ammonia fuel in the supply tank 118 to a suitable temperature such that an ammonia vapor pressure in the supply tank 118 is within a range approximately equal to an operating pressure range of a fuel pump. This pressure range may vary depending on the requirements and operating conditions of the power generation system 100. Generating the ammonia vapor pressure in the supply tank 118 that is approximately equal to an operating pressure range of a fuel pump may enable the fuel pump to be omitted or bypassed since the ammonia vapor pressure is capable of driving the liquid ammonia fuel towards the combustor 106 at a substantially similar rate as the fuel pump.

In the exemplary embodiment, the fuel supply system 114 also includes a supply skid 134, also referred to as a start-up skid 134, that is disposed on the fuel supply line 116 between the supply tank 118 and the combustor 106. The start-up skid will be described in more detail below with reference to FIG. 4. The start-up skid 134 may facilitate driving the liquid ammonia fuel from the supply tank 118 to the combustor 106 during a start-up operation while the temperature and the ammonia vapor pressure in the supply tank 118 ramp up.

The start-up skid 134 is communicatively coupled to a controller 136 which is configured to selectively operate the start-up skid 134 based on the ammonia vapor pressure in the supply tank 118. For example, the controller 136 may selectively operate the start-up skid 134 based on a measured ammonia vapor pressure in the supply tank 118 and/or a determined pressure differential between the ammonia vapor pressure and an operating pressure of the combustor 106. The controller 136 may receive ammonia vapor pressure measurements from one or more supply tank pressure sensors 138 coupled to the supply tank 118. The controller 136 may also receive combustor pressure measurements from one or more combustor pressure sensors 140 coupled to the combustor 106. Other sensors, such as temperature sensors (e.g., sensor 142), may also be coupled to the supply tank 118 and/or the combustor 106 to enable the controller 136 to function as described herein.

The controller 136 may additionally and/or alternatively be communicatively coupled to the heat exchanger 128, the temperature sensor 142 coupled to the heat exchanger 128 and/or the supply tank 118, the heat source 130, or the one or more heat transfer fluid flow control devices 144 disposed between the heat source 130 and the heat exchanger 128. The controller 136 may be configured to adjust (e.g., increase or decrease) heating of the liquid ammonia fuel in the supply tank 118 provided by the heat exchanger 128. For example, the controller 136 may adjust (e.g., increase or decrease) flow of the heat exchange fluid supplied to the heat exchanger 128 by selectively controlling (e.g., metering) the heat transfer fluid flow control device 144. The controller 136 may selectively control the heat transfer fluid flow control device 144 based on feedback from sensors (e.g., pressure sensor(s) 138 and/or temperature sensor(s) 142) coupled to the supply tank 118 and/or the heat exchanger 128 to achieve a desired heating of the liquid ammonia fuel and/or a desired ammonia vapor pressure in the supply tank 118.

In the exemplary embodiment, the controller 136 is a computer system that includes at least one processor (not shown) and at least one memory device (not shown). The memory device may include a non-transitory computer-readable medium and program that are accessed by the processor to execute operations to control the start-up skid 134. Operations executed by the controller 136 using the processor may include applying a control algorithm to selectively operate the start-up skid 134 and/or to adjust heating provided by the heat exchanger 128 based, for example, on the ammonia vapor pressure in the supply tank and/or a determined pressure differential between the ammonia vapor pressure and an operating pressure of the combustor 106.

The controller 136 may include a communication interface to communicatively couple the controller 136, via one or more connections 162, to one or more components of the system 100. For example, the one or more connections 162 may communicatively couple the controller 136 to the sensors 138, 140, 142, the start-up skid 134, the heat transfer fluid flow control device(s) 144, the heat exchanger 128, and/or other components of the system 100. The communication interface may include, for example, a wired or wireless network adapter and/or a wireless data transceiver for use with a mobile telecommunications network. In this way, the one or more connections 162 may communicatively couple the controller 136 to the one or more components of the system 100 via a wired and/or wireless connection.

In some embodiments, the controller 136 may include and/or generate an operational model of the fuel supply system 114 and the combustor 106. The operational model may define operational boundaries of the combustor 106 based on the liquid ammonia fuel supplied to the combustor 106 by the fuel supply system 114. The controller 136 may identify that an ammonia vapor pressure in the supply tank 118 presents a risk of violating the operational boundaries, for example, where the ammonia vapor pressure is insufficient to drive the ammonia liquid fuel to combustor 106 and may negatively affect flame propagation and/or cause unacceptable combustion conditions (e.g., lean blow-out or engine knock). In this respect, the controller 136 may predict a combustion condition associated with the ammonia vapor pressure in the supply tank 118. The controller 136 may thereby determine in real-time whether the ammonia vapor pressure should be adjusted (e.g., increased). In response, the controller 136 may generate an output signal that adjusts the heating provided by the heat exchanger 128.

For example, the controller 136 may selectively control the one or more heat transfer fluid flow control devices 144 to adjust (e.g., increase or decrease) the flow of the heat transfer fluid supplied to the heat exchanger 128. Additionally, and/or alternatively, in response to determining whether the ammonia vapor pressure in the supply tank 118 should be adjusted (e.g., increased), the controller 136 may selectively operate the start-up skid 134 in a start-up mode to drive the liquid ammonia fuel from the supply tank 118 to the combustor 106 while the temperature and the ammonia vapor pressure in the supply tank 118 ramps up to a desired level. When the controller 136 determines that the ammonia vapor pressure in the supply tank 118 is sufficient to drive the liquid ammonia fuel towards the combustor 106, the controller may selectively operate the start-up skid 134 to enter an idle or bypass mode, as discussed further herein.

In some embodiments, the controller 136 may receive feedback signals from the combustor 106 (e.g., via the combustor pressure sensor 140 or other sensors) and may use the feedback signals in a feedback application to update the operational model. For example, the controller 136 may compare a combustion signal from the combustor 106 to the predicted combustion condition determined by comparing the ammonia vapor pressure in the supply tank 118 to the operational model. The controller 136 may determine whether the predicted combustion condition matches combustion behavior indicated by the combustion signal. If the predicted combustion condition does not match the combustion behavior, the controller 136 may update the operational model by associating the ammonia vapor pressure of the supply tank 118 with the combustion feedback. In this way, ammonia vapor pressures that are associated with negative combustion behaviors in the combustor 106 can be identified and the operational model can be updated to facilitate predicting these conditions condition in real-time for similar ammonia vapor pressures in the supply tank 118.

Figure 4:
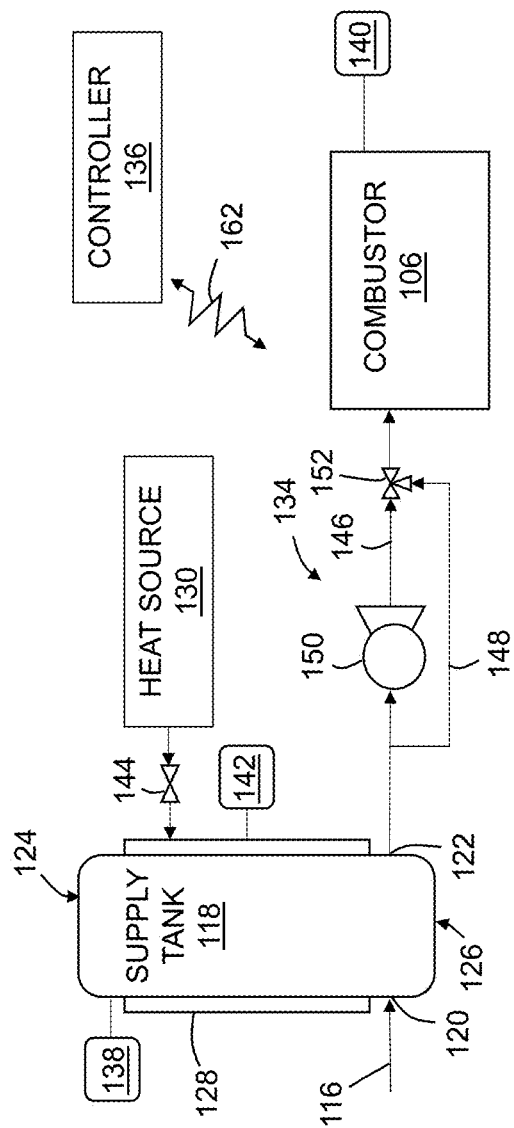
FIG. 4 is a schematic illustration of a portion of the power generation system of FIG. 1, showing an exemplary start-up skid that may be included in the fuel supply system of FIGS. 1-3 in greater detail; and, FIG. 5 is a flow chart of an exemplary method of supplying a liquid ammonia fuel to a rotary machine, such as a gas turbine engine associated with the power generation system of FIGS. 1-3.

FIG. 4 is a schematic illustration of a portion of the exemplary power generation system 100 of FIG. 1 and illustrates the start-up skid 134 disposed between the supply tank 118 and the combustor 106 in greater detail. In the exemplary embodiment, the start-up skid 134 includes a start-up line 146 and a bypass line 148, which may also be considered as part of the fuel supply line 116. The start-up line 146 extends from the supply tank 118 to the combustor 106 and includes a start-up fuel pump 150 configured to drive the liquid ammonia fuel to the combustor 106. Because the start-up fuel pump 150 is used only during a relatively short start-up period, the start-up fuel pump 150 can be a low-capacity fuel pump, thereby reducing capital and maintenance costs associated with the fuel pump 150 (e.g., as compared with a fuel pump 150 sized for continuous use).

Suitably, the start-up skid 134 is configured such that the start-up fuel pump 150 is operated when the ammonia vapor pressure in the supply tank 118 is at a pressure that is insufficient to drive the liquid ammonia fuel to the combustor 106. For example, during a start-up operation of the power generation system 100, while the heat exchanger 128 begins heating the liquid ammonia fuel in the supply tank 118, the ammonia vapor pressure in the supply tank 118 may be insufficient to drive the initial stream of liquid ammonia fuel to the combustor 106 for start-up. At this stage, the start-up fuel pump 150 may be used.

The bypass line 148 is disposed for channeling the liquid ammonia fuel to selectively bypass the start-up line 146 and start-up pump 150. The bypass line 148 has an inlet end in fluid communication with the start-up line 146 upstream of the start-up pump 150 and an outlet end in fluid communication with the start-up line 146 downstream of the start-up pump 150, thus selectively directing the liquid ammonia fuel around (i.e., bypassing) the start-up pump 150. The start-up skid 134 also includes a control valve 152 configured to selectively route the liquid ammonia fuel from the supply tank 118 through one of the start-up line 146 and the bypass line 148. In particular, the control valve 152 may be controlled by the controller 136 to be selectively opened at certain operating conditions of the fuel supply system 114 (e.g., when the ammonia vapor pressure in the supply tank 118 is sufficient to drive the liquid ammonia fuel without the start-up fuel pump 150) to route the liquid ammonia fuel around the start-up line 146 via the bypass line 148. As shown in FIG. 4, the control valve 152 is positioned downstream from the start-up fuel pump 150. In this example, the control valve 152 may be selectively operable to modulate or meter flow of the liquid ammonia fuel through the start-up line 146 and/or the bypass line 148, such that a position of the control valve 152 may be adjusted to allow the liquid ammonia fuel to substantially entirely flow through one of the start-up line 146 or the bypass line 148, or to allow some of the liquid ammonia fuel to flow through each of the start-up line 146 and the bypass line 148. In other examples, the control valve 152 may be located upstream from the start-up fuel pump 150.

The controller 136 may be communicatively coupled to the control valve 152 and configured to operate the control valve 152 based on the ammonia vapor pressure in the supply tank 118. For example, the controller 136 may operate the control valve 152 to selectively route the liquid ammonia fuel through the start-up line 146 when the ammonia vapor pressure in the supply tank 118 is insufficient, such that the start-up fuel pump 150 is used to drive the liquid ammonia fuel towards the combustor 106. When the ammonia vapor pressure in the supply tank 118 is sufficient to drive the liquid ammonia fuel without the start-up fuel pump 150, the controller 136 may operate the control valve 152 to selectively route the liquid ammonia fuel through the bypass line 148. The controller may also modulate or meter the control valve 152 such that, as the supply tank 118 heats up and the ammonia vapor pressure in the supply tank 118 increases, flow of the liquid ammonia fuel in the bypass line 148 is progressively increased while flow of the liquid ammonia fuel in the start-up line 146 is progressively reduced.

Referring again to FIG. 1, the fuel supply system 114 may also include a storage tank 154 disposed on the fuel supply line 116 upstream from the supply tank 118. The storage tank 154 is sized and shaped to receive a volume of the liquid ammonia fuel therein (e.g., from a pipeline or other source) and contain the volume of the liquid ammonia fuel for replenishing the supply tank 118. The dimensions of the storage tank 154 may vary depending on the capacity requirements of the power generation system 100 as well as the dimensions of the supply tank 118. One storage tank 154 or more than one storage tank 154 may be included in the fuel supply system 114. The fuel supply system 114 may include more or fewer storage tanks 154 than the supply tank(s) 118, or an equal number of storage tanks 154 and supply tanks 118 may be included for each power generation system 100. In embodiments where multiple supply tanks 118 are included, one or more than one storage tank 154 may be included and coupled to one of the supply tanks 118. Alternatively, one storage tank 154 may be included and coupled to each supply tank 118. The storage tank 154 includes an inlet 160 to allow the liquid ammonia fuel to enter the storage tank 154 and an outlet 158 to allow the liquid ammonia fuel to exit the storage tank 154. Each of the inlet 160 and the outlet 158 may be defined by fittings (not shown) that couple to the fuel supply line 116. A non-return valve 156 may be disposed between the storage tank 154 and the supply tank 118 to facilitate preventing backflow of the liquid ammonia fuel from the supply tank 118 to the storage tank 154.

Liquid ammonia fuel may be maintained at a lower temperature and pressure in the storage tank 154 relative to a temperature and pressure in the supply tank 118 such that the liquid ammonia fuel does not substantially vaporize in the storage tank 154. As the liquid ammonia fuel in the supply tank 118 is driven towards the combustor 106, the liquid ammonia fuel in the storage tank 154 is channeled through non-return valve 156 towards the supply tank 118 to replenish a volume of the liquid ammonia fuel in the supply tank 118. The replenished liquid ammonia fuel in the supply tank 118 maintains the ammonia vapor pressure equilibrium in the storage tank 154 because the relative quantities of the vaporized ammonia and the liquid ammonia fuel in the supply tank 118 are kept substantially constant. Moreover, the presence of the heat exchanger 128 and/or thermal insulation around the supply tank 118 and the size of the supply tank 118 (relative to the rate at which the liquid ammonia fuel is entering and exiting the supply tank 118) may be such that any change in temperature in the supply tank 118 due to the replenished, cold liquid ammonia fuel is negligible and does not substantially affect the ammonia vapor pressure in the supply tank 118. Thus, the storage tank 154 facilitates maintaining a continuous flow of the liquid ammonia fuel being driven towards the combustor 106 using the ammonia vapor pressure in the supply tank 118.

Figure 2:
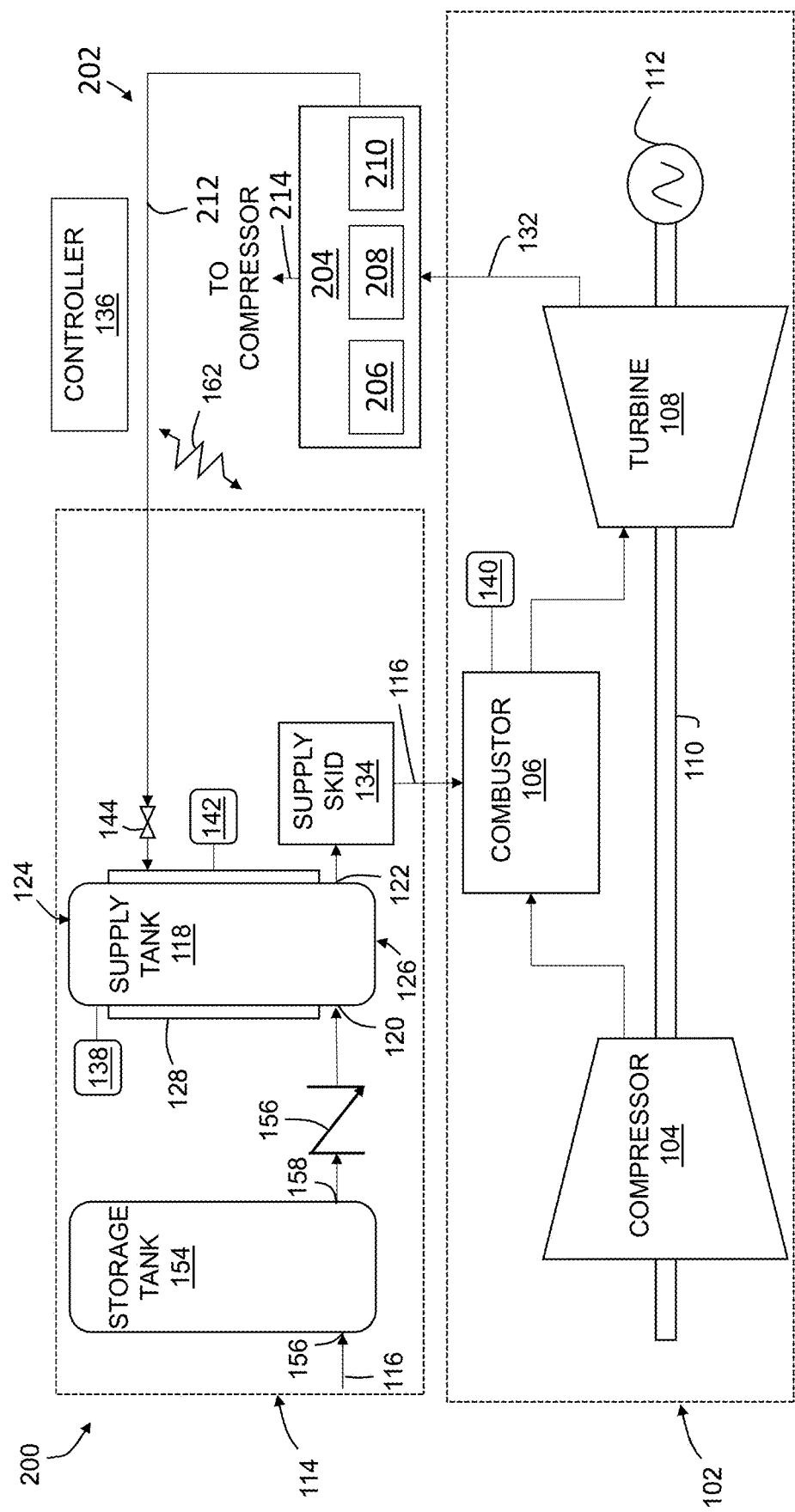
FIG. 2 is a schematic illustration of another power generation system, including the exemplary fuel supply system of FIG. 1 and an exhaust gas recirculation system coupled to the fuel supply system.

FIG. 2 is a schematic illustration of an alternative power generation system 200 that includes the gas turbine engine 102 and the liquid ammonia fuel supply system 114 of FIG. 1. The power generation system 200 includes all the elements and components shown in FIG. 1 and described herein for the power generation system 100. The power generation system 100 also includes an exhaust gas recirculation (EGR) system 202 downstream from and fluidly coupled to the gas turbine engine 102. The EGR system 202 may be used to recirculate exhaust gases generated by the gas turbine engine 102 back towards the compressor 104. The exhaust gases are mixed with the working fluid entering the compressor 104, which may dilute the working fluid to reduce the amount of oxygen entrained in the compressed working fluid, thereby facilitating reducing the peak firing temperature in the combustor 106 and/or reducing the formation of $NO_x$. The EGR system 202 is also coupled to the heat exchanger 128 via an exhaust gas line 212 and is used as the heat source 130 in this embodiment. In this respect, waste heat in the exhaust gases may be used for heating the liquid ammonia fuel in the supply tank 118.

The EGR system 202 includes an exhaust gas treatment system 204 that is coupled to the exhaust duct 132 and that receives the exhaust gases generated by the gas turbine engine 102. The exhaust gases are treated using the exhaust gas treatment system 204 and are subsequently recirculated through an EGR loop 214 towards the compressor 104. A portion of treated exhaust gases are also discharged from the exhaust gas treatment system 204 and channeled towards the heat exchanger 128 via the exhaust gas line 212. In certain embodiments, the exhaust gas treatment system 204 may include a plurality of treatment units for use in producing the treated exhaust gases, such as a filter unit 206, a selective catalytic reduction unit 208, an absorption unit 210, and/or any other type of exhaust gas treatment unit. The treated exhaust gases exiting the exhaust gas treatment system 204 may have a lower temperature and/or lower saturation (e.g., moisture content) than a temperature and/or saturation of the exhaust gases exiting the gas turbine engine 102 via the exhaust duct 132.

In some embodiments, the compressor 104 and/or the heat exchanger 128 may receive the treated exhaust gases exiting the exhaust gas treatment system 204, untreated exhaust gases exiting the gas turbine engine 102 via the exhaust duct 132, or any other source of exhaust gas generated within the power generation system 200 with or without passing through various equipment. For example, in some embodiments, exhaust gases from the gas turbine engine 102 may be recirculated to the compressor 104 via the EGR loop 214 and/or the heat exchanger 128 via the exhaust gas line 212 without flowing through the exhaust gas treatment system 202.

The exhaust gases may be channeled through the respective EGR loop 214 and the exhaust gas line 212 using one or more recirculation blowers or compressors (not shown) of the EGR system 202. In some embodiments, the EGR system 202 may include a control valve or other control equipment (e.g., a splitter, not shown) to facilitate controlling a ratio of the exhaust gases being channeled to the compressor 104 and to the heat exchanger 128. For example, the EGR system 202 may recirculate from between about 0% to about 40% of the exhaust gases exiting the gas turbine engine 102 through the EGR loop 214 to the compressor 104, and another portion of the exhaust gases are channeled through the exhaust gas line 212 to the heat exchanger 128. In some embodiments, the portion of the exhaust gases channeled through the exhaust gas line 212 to the heat exchanger 128 may be drawn upstream from the exhaust gas treatment system 204, and the portion of the exhaust gases channeled through the EGR loop 214 to the compressor 104 are drawn downstream from the exhaust gas treatment system 204.

The one or more heat transfer fluid flow control devices 144 may be disposed on the exhaust gas line 212 upstream from the heat exchanger 128. As described above, the heat transfer fluid flow control devices 144 are selectively operable to facilitate adjusting the amount of the exhaust gases (which are used as the heat transfer fluid in this embodiment) supplied to the heat exchanger 128 to achieve a desired heating of the liquid ammonia fuel in the supply tank 118. The heat transfer fluid flow control device 144 may be selectively operated using operating condition feedback from sensors (e.g., the pressure sensor(s) 138 and/or the temperature sensor(s) 142) coupled to the supply tank 118 and/or the heat exchanger 128. For example, the controller 136 may adjust (e.g., increase or decrease) flow of the exhaust gases in the exhaust gas line 212 by selectively controlling (e.g., metering) the heat transfer fluid flow control device 144 based on feedback from sensors (e.g., pressure sensor(s) 138 and/or temperature sensor(s) 142) coupled to the supply tank 118 and/or the heat exchanger 128 to achieve a desired heating of the liquid ammonia fuel and/or a desired ammonia vapor pressure in the supply tank 118. The exhaust gas line 212 may, in some embodiments, also include thermal insulation to insulate heat as the exhaust gases are channeled towards the heat exchanger 128.

Figure 3:
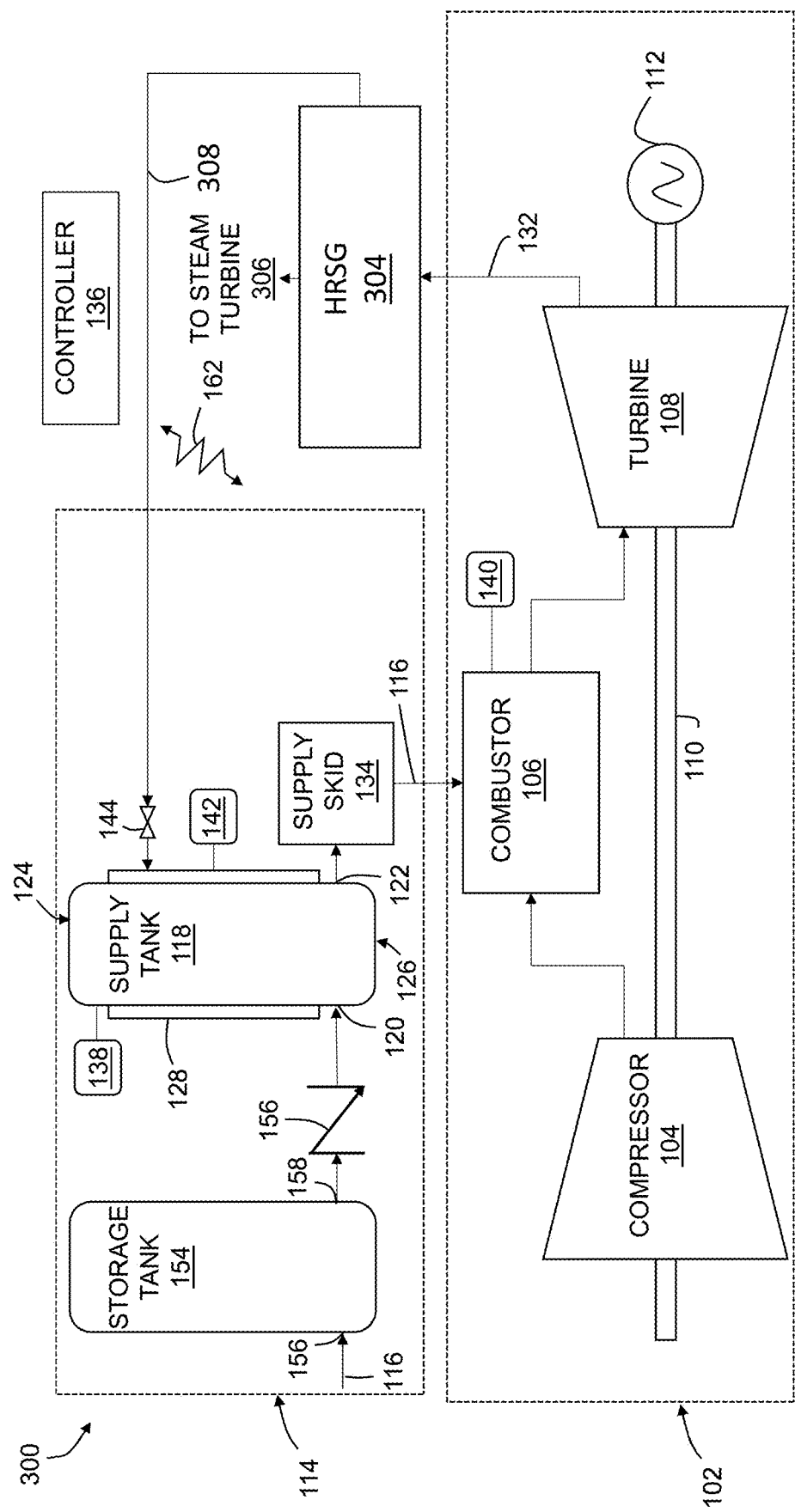
FIG. 3 is a schematic illustration of a combined cycle power plant including the exemplary fuel supply system of FIG. 1.

FIG. 3 is a schematic illustration of a combined cycle power plant 300 that includes the gas turbine engine 102 and the liquid ammonia fuel supply system 114 of FIG. 1. The combined cycle power plant 300 includes all the elements and components shown in FIG. 1 and described herein for the power generation system 100. The combined cycle power plant 300 also includes a heat recovery steam generator 304 downstream from and fluidly coupled to the gas turbine engine 102 via the exhaust duct 132. The combined cycle power plant 300 may also include a steam turbine 306 downstream from and fluidly coupled to the HRSG 304.

The HRSG 304 is used to generate exhaust steam at high pressure and high temperature using waste heat available in the exhaust gases exiting the gas turbine engine 102 via the exhaust duct 132. The generated steam may be at least partially conveyed to the steam turbine 306 for operating the steam turbine 306. The HRSG 304 may include various components that facilitate generating steam using the exhaust gases, such as a pre-heater, an evaporator, an economizer, a re-heater, and a super-heater. One, more than one, or all these components may be incorporated into the HRSG 304. The evaporator may be used to vaporize water for producing steam and can include several drums for allowing water to interact with the exhaust gases entering the HRSG 304. The economizer may be used to preheat feedwater upstream from the evaporator. The steam generated in the evaporator may be saturated steam, and the saturated steam exiting the evaporator may be provided to the super-heater for producing dry steam. Dry steam exiting the HRSG 304 may be used to operate the steam turbine 306.

In the exemplary combined cycle power plant 300, a portion of the steam generated using the HRSG 304 is also channeled to the heat exchanger 128. Waste heat in the steam is used as the heat source 130 for heating the liquid ammonia fuel in the supply tank 118. In the illustrated embodiment, the HRSG 304 is coupled to the heat exchanger 128 via a steam line 308. Steam is drawn from the HRSG 304 and channeled to the heat exchanger 128 in the steam line 308. The steam being channeled via the steam line 308 to the heat exchanger 128 may be saturated or dry steam. In other embodiments, the steam used in the heat exchanger 128 may be drawn downstream from the steam turbine 306.

The one or more heat transfer fluid flow control devices 144 may be disposed on the steam line 308 upstream from the heat exchanger 128. As described above, the heat transfer fluid flow control devices 144 are selectively operable to facilitate adjusting the amount of the steam (which is used as the heat transfer fluid in this embodiment) supplied to the heat exchanger 128 to achieve a desired heating of the liquid ammonia fuel in the supply tank 118. The heat transfer fluid flow control device 144 may be selectively operated using operating condition feedback from sensors (e.g., the pressure sensor(s) 138 and/or the temperature sensor(s) 142) coupled to the supply tank 118 and/or the heat exchanger 128. For example, the controller 136 may adjust (e.g., increase or decrease) flow of the steam in the steam line 308 by selectively controlling (e.g., metering) the heat transfer fluid flow control device 144 based on feedback from sensors (e.g., pressure sensor(s) 138 and/or temperature sensor(s) 142) coupled to the supply tank 118 and/or the heat exchanger 128 to achieve a desired heating of the liquid ammonia fuel and/or a desired ammonia vapor pressure in the supply tank 118. The steam line 308 may, in some embodiments, also include thermal insulation to insulate heat as the steam is channeled towards the heat exchanger 128.

Figure 5:
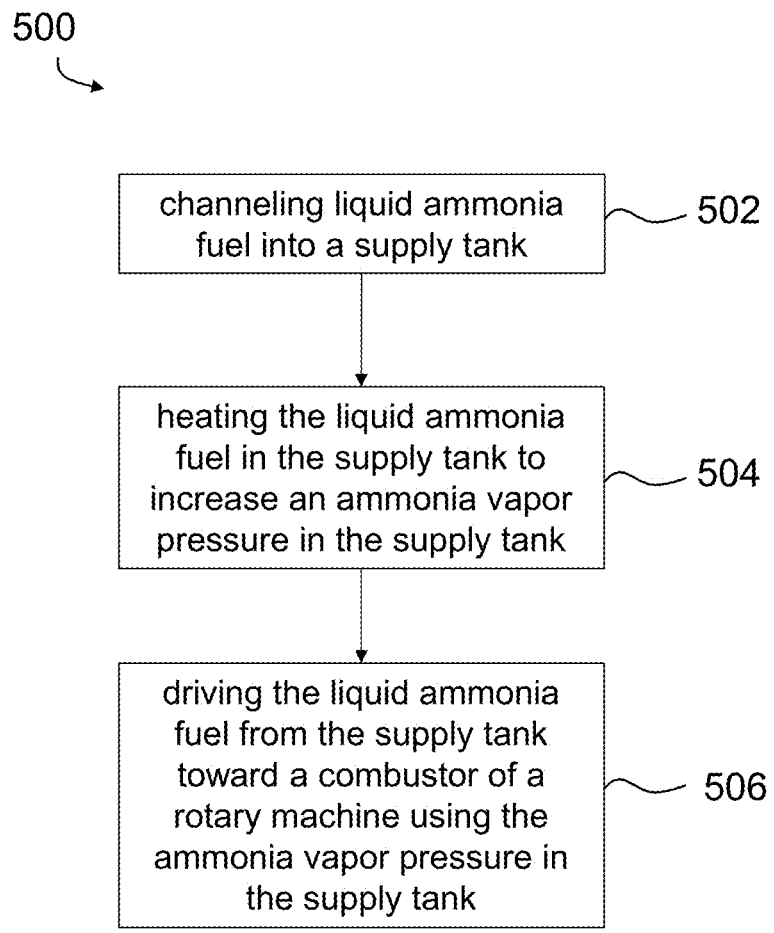

FIG. 5 is a flow chart of an exemplary method 500 of supplying a liquid ammonia fuel to a rotary machine (e.g., the rotary machine or gas turbine engine 102). The method 500 may be implemented using the fuel supply system 114 in a power generation system (e.g., the system 100 in FIGS. 1 and/or 200 in FIG. 2) and/or a combined cycle power plant (e.g., the plant 300 in FIG. 3). The method 500 includes channeling 502 the liquid ammonia fuel into a supply tank 118 located upstream from the rotary machine 102. The method 500 also includes heating 504 the liquid ammonia fuel in the supply tank 118 to thereby increase an ammonia vapor pressure in the supply tank 118. The liquid ammonia fuel may be heated in the supply tank 118 using any suitable heat source 130. In some embodiments, the liquid ammonia fuel in the supply tank 118 may be heated 504 using exhaust gases generated by the rotary machine 102 or steam generated downstream from the rotary machine 102 (e.g., by an HRSG 304).

The method 500 also includes driving 506 the liquid ammonia fuel from the supply tank 118 towards a combustor 106 of the rotary machine 102 using the ammonia vapor pressure in the supply tank 118. In this respect, the liquid ammonia fuel in the supply tank 118 is heated to a suitable temperature such that the ammonia vapor pressure in the supply tank 118 is capable of driving 506 the liquid ammonia fuel towards the combustor 106. In some embodiments, the liquid ammonia fuel in the supply tank 118 may be heated 504 to a temperature of at least about 20° C., at least about 30° C., at least about 40° C., at least about 50° C., at least about 60° C., at least about 70° C., at least about 80° C., at least about 90° C., at least about 100° C., at least about 110° C., or at least about 120° C., such as between about 20° C. to about 150° C., between about 40° C. to about 150° C., or about 125° C. In some embodiments, the liquid ammonia fuel in the supply tank 118 is heated 504 to a suitable temperature such that the ammonia vapor pressure in the supply tank 118 is at least about 15 bara, at least about 20 bara, at least about 30 bara, at least about 40 bara, at least about 50 bara, at least about 60 bara, at least about 70 bara, at least about 80 bara, or at least about 90 bara, such as between about 15 bara to about 125 bara, or about 100 bara.

In some embodiments, the method 500 includes operating a start-up skid 134 to drive the liquid ammonia fuel towards the combustor 106 while heating 504 the liquid ammonia fuel in the supply tank 118. For example, the method 500 may include driving the liquid ammonia fuel to the combustor 106 using a fuel pump 150 when the ammonia vapor pressure in the supply tank 118 is at a first pressure (e.g., a pressure below a set point ammonia vapor pressure), heating the liquid ammonia fuel in the supply tank to increase the ammonia vapor pressure in the supply tank from the first pressure to a second pressure (e.g., a pressure at or above the set point ammonia vapor pressure), and, when the ammonia vapor pressure in the supply tank is at the second pressure, selectively bypassing the fuel pump 150 and driving 506 the liquid ammonia fuel from the supply tank 118 towards the combustor 106 of the rotary machine 102 using the ammonia vapor pressure in the supply tank 118.

In some embodiments, the liquid ammonia fuel may be channeled 502 from a storage tank 154 upstream from the supply tank 118 and through a non-return valve 156 that limits or prevents backflow of the liquid ammonia fuel from the supply tank 118 to the storage tank 154. In some such embodiments, the method 500 may include replenishing the liquid ammonia fuel in the supply tank 118 using the storage tank 154 to thereby maintain the ammonia vapor pressure in the supply tank 118.

The above-described systems and methods facilitate supplying ammonia fuel to a combustor described herein while reducing or eliminating the costs, maintenance, and other limitations otherwise associated with use of ammonia as a combustion fuel. In particular, the systems and methods described herein include the use of a self-pressurized supply tank for driving the ammonia fuel to the rotary machine, which may eliminate the need for fuel pumps to move the ammonia fuel or which may significantly reduce the required capacity of such fuel pumps (e.g., low-capacity fuel pumps may only be needed during a start-up operation). The self-pressurized supply tanks also facilitate reducing or eliminating the propensity for gaseous ammonia to become entrained in the liquid ammonia fuel supplied to the combustor, which otherwise may negatively affect flame propagation and/or cause undesirable combustion dynamics in the combustor section. In particular, the liquid ammonia fuel in the self-pressurized tank is driven by a pressure differential towards the combustor, rather than mechanical action which may generate gaseous ammonia bubbles in the liquid ammonia fuel stream. Accordingly, the exemplary systems and methods provide significant technical advantages and facilitate using ammonia combustion fuels while reducing or eliminating the costs and other limitations that may otherwise hinder such use.

Further aspects of the present disclosure are provided by the subject matter of the following clauses:

Clause 1. A power generation system comprising: a rotary machine comprising a combustor; and a fuel supply system configured to supply a liquid ammonia fuel to the combustor, the fuel supply system comprising: a fuel supply line coupled to the combustor; a supply tank disposed on the fuel supply line upstream from the combustor, wherein the supply tank is sized to receive the liquid ammonia fuel therein; and a heat exchanger configured to heat the liquid ammonia fuel in the supply tank such that an ammonia vapor pressure in the supply tank is sufficient to drive the liquid ammonia fuel from the supply tank towards the combustor.

Clause 2. The power generation system of Clause 1, wherein the fuel supply system further comprises a start-up skid disposed on the fuel supply line between the supply tank and the combustor, wherein the start-up skid comprises: a start-up line comprising a fuel pump; a bypass line around the fuel pump; and a control valve configured to selectively route the liquid ammonia fuel from the supply tank through one of the start-up line and the bypass line based on the ammonia vapor pressure in the supply tank.

Clause 3. The power generation system of Clause 2, further comprising a controller configured to operate the control valve based on the ammonia vapor pressure in the supply tank.

Clause 4. The power generation system of any preceding clause, wherein the heat exchanger is a heating jacket of the supply tank.

Clause 5. The power generation system of any preceding clause, wherein the rotary machine is a gas turbine engine comprising the combustor and a turbine coupled to the combustor, wherein the turbine is configured to generate exhaust gases.

Clause 6. The power generation system of any preceding clause, further comprising an exhaust gas recirculation system configured to recirculate the exhaust gases from the turbine towards the heat exchanger, wherein the heat exchanger is configured to heat the liquid ammonia fuel in the supply tank using the exhaust gases.

Clause 7. The power generation system of any preceding clause, wherein the heat exchanger is configured to heat the liquid ammonia fuel in the supply tank to a temperature of at least about 20° C.

Clause 8. The power generation system of any preceding clause, wherein the heat exchanger is configured to heat the liquid ammonia fuel in the supply tank such that the ammonia vapor pressure in the supply tank is at least about 15 bar absolute (bara).

Clause 9. The power generation system of any preceding clause, wherein the fuel supply system further comprises a storage tank disposed on the fuel supply line upstream from the supply tank, wherein the storage tank is sized to receive the liquid ammonia fuel therein.

Clause 10. The power generation system of Clause 9, further comprising a non-return valve disposed on the fuel supply line between the storage tank and the supply tank.

Clause 11. A combined cycle power plant comprising: a gas turbine engine comprising a combustor; a heat recovery steam generator (HRSG) coupled to the gas turbine engine; and a fuel supply system configured to supply a liquid ammonia fuel to the gas turbine engine, the fuel supply system comprising: a fuel supply line coupled to the gas turbine engine; a supply tank disposed on the fuel supply line upstream from the gas turbine engine, wherein the supply tank is sized to receive the liquid ammonia fuel therein; and a heat exchanger configured to heat the liquid ammonia fuel in the supply tank such that an ammonia vapor pressure in the supply tank is sufficient to drive the liquid ammonia fuel from the supply tank towards the gas turbine engine, wherein the heat exchanger is configured to use steam generated by the HRSG to heat the liquid ammonia fuel in the supply tank.

Clause 12. The combined cycle power plant of Clause 11, further comprising a steam turbine coupled to the HRSG.

Clause 13. The combined cycle power plant of Clause 11 or Clause 12, wherein the fuel supply system further comprises a start-up skid disposed on the fuel supply line between the supply tank and the gas turbine engine, wherein the start-up skid comprises: a start-up line comprising a fuel pump; a bypass line around the fuel pump; and a control valve configured to selectively route the liquid ammonia fuel from the supply tank through one of the start-up line and the bypass line based on the ammonia vapor pressure in the supply tank.

Clause 14. The combined cycle power plant of Clause 13, further comprising a controller configured to operate the control valve based on the ammonia vapor pressure in the supply tank.

Clause 15. The combined cycle power plant of any one of Clauses 11-14, wherein the heat exchanger is configured to heat the liquid ammonia fuel in the supply tank to a temperature of about 125° C.

Clause 16. The combined cycle power plant of any one of Clauses 11-15, wherein the heat exchanger is configured to heat the liquid ammonia fuel in the supply tank such that the ammonia vapor pressure in the supply tank is about 100 bar absolute (bara).

Clause 17. The combined cycle power plant of any one of Clauses 11-16, wherein the fuel supply system further comprises a storage tank disposed on the fuel supply line upstream from the supply tank, wherein the storage tank is sized to receive the liquid ammonia fuel therein.

Clause 18. A method of supplying a liquid ammonia fuel to a rotary machine, the method comprising: channeling the liquid ammonia fuel into a supply tank; heating the liquid ammonia fuel in the supply tank to thereby increase an ammonia vapor pressure in the supply tank; and driving the liquid ammonia fuel from the supply tank towards a combustor of the rotary machine using the ammonia vapor pressure in the supply tank.

Clause 19. The method of Clause 18, further comprising: driving the liquid ammonia fuel to the combustor using a fuel pump when the ammonia vapor pressure in the supply tank is at a first pressure; heating the liquid ammonia fuel in the supply tank to increase the ammonia vapor pressure in the supply tank from the first pressure to a second pressure; and when the ammonia vapor pressure in the supply tank is at the second pressure, the driving of the liquid ammonia fuel from the supply tank towards the combustor of the rotary machine using the ammonia vapor pressure in the supply tank occurs by selectively bypassing the fuel pump.

Clause 20. The method of Clause 18 or Clause 19, further comprising heating the liquid ammonia fuel in the supply tank using one of exhaust gases generated by the rotary machine and steam generated downstream from the rotary machine.

The above description is meant to be exemplary only, and one skilled in the art will recognize that changes may be made to the embodiments described without departing from the scope of the disclosure. Modifications, which fall within the scope of the present disclosure, will be apparent to those skilled in the art, in light of a review of this disclosure, and such modifications are intended to fall within the appended claims. The systems and methods described herein are not limited to the specific embodiments described herein, but rather components of the various systems may be utilized independently and separately from other systems and components described herein. For example, the exhaust gas recirculation mixer can be implemented and utilized in connection with any application where ammonia is desired to be used as a combustion fuel.

The methods and systems described herein are not limited to the specific embodiments described herein. For example, components of each system and/or steps of each method may be utilized independently and separately from other components and/or steps described herein. For example, the method and systems may also be used in combination with other combustion systems, and are not limited to practice only with the gas turbine engines as described herein. Rather, the exemplary embodiment can be implemented and utilized in connection with many other rotary machine and combustion applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power generation system comprising:
   a rotary machine comprising a combustor; and
   a fuel supply system configured to supply a liquid ammonia fuel to the combustor, the fuel supply system comprising:
   a fuel supply line coupled to the combustor;
   a supply tank disposed on the fuel supply line upstream from the combustor, wherein the supply tank is sized to receive the liquid ammonia fuel therein; and,
   a heat exchanger configured to heat the liquid ammonia fuel in the supply tank such that an ammonia vapor pressure in the supply tank is sufficient to drive the liquid ammonia fuel from the supply tank towards the combustor.

2. The power generation system of claim 1, wherein the fuel supply system further comprises a start-up skid disposed on the fuel supply line between the supply tank and the combustor, wherein the start-up skid comprises:
   a start-up line comprising a fuel pump;
   a bypass line around the fuel pump; and,
   a control valve configured to selectively route the liquid ammonia fuel from the supply tank through one of the start-up line and the bypass line based on the ammonia vapor pressure in the supply tank.

3. The power generation system of claim 2, further comprising a controller configured to operate the control valve based on the ammonia vapor pressure in the supply tank.

4. The power generation system of claim 1, wherein the heat exchanger is a heating jacket of the supply tank.

5. The power generation system of claim 1, wherein the rotary machine is a gas turbine engine comprising the combustor and a turbine coupled to the combustor, wherein the turbine is configured to generate exhaust gases.

6. The power generation system of claim 5, further comprising an exhaust gas recirculation system configured to recirculate the exhaust gases from the turbine towards the heat exchanger, wherein the heat exchanger is configured to heat the liquid ammonia fuel in the supply tank using the exhaust gases.

7. The power generation system of claim 1, wherein the heat exchanger is configured to heat the liquid ammonia fuel in the supply tank to a temperature of at least about 20° C.

8. The power generation system of claim 1, wherein the heat exchanger is configured to heat the liquid ammonia fuel in the supply tank such that the ammonia vapor pressure in the supply tank is at least about 15 bar absolute (bara).

9. The power generation system of claim 1, wherein the fuel supply system further comprises a storage tank disposed on the fuel supply line upstream from the supply tank, wherein the storage tank is sized to receive the liquid ammonia fuel therein.

10. The power generation system of claim 9, further comprising a non-return valve disposed on the fuel supply line between the storage tank and the supply tank.

11. A combined cycle power plant comprising:
    a gas turbine engine comprising a combustor;
    a heat recovery steam generator (HRSG) coupled to the gas turbine engine; and,
    a fuel supply system configured to supply a liquid ammonia fuel to the gas turbine engine, the fuel supply system comprising:
    a fuel supply line coupled to the gas turbine engine;
    a supply tank disposed on the fuel supply line upstream from the gas turbine engine, wherein the supply tank is sized to receive the liquid ammonia fuel therein; and,
    a heat exchanger configured to heat the liquid ammonia fuel in the supply tank such that an ammonia vapor pressure in the supply tank is sufficient to drive the liquid ammonia fuel from the supply tank towards the gas turbine engine, wherein the heat exchanger is configured to use steam generated by the HRSG to heat the liquid ammonia fuel in the supply tank.

12. The combined cycle power plant of claim 11, further comprising a steam turbine coupled to the HRSG.

13. The combined cycle power plant of claim 11, wherein the fuel supply system further comprises a start-up skid disposed on the fuel supply line between the supply tank and the gas turbine engine, wherein the start-up skid comprises:
    a start-up line comprising a fuel pump;
    a bypass line around the fuel pump; and,
    a control valve configured to selectively route the liquid ammonia fuel from the supply tank through one of the start-up line and the bypass line based on the ammonia vapor pressure in the supply tank.

14. The combined cycle power plant of claim 13, further comprising a controller configured to operate the control valve based on the ammonia vapor pressure in the supply tank.

15. The combined cycle power plant of claim 11, wherein the heat exchanger is configured to heat the liquid ammonia fuel in the supply tank to a temperature of about 125° C.

16. The combined cycle power plant of claim 11, wherein the heat exchanger is configured to heat the liquid ammonia fuel in the supply tank such that the ammonia vapor pressure in the supply tank is about 100 bar absolute (bara).

17. The combined cycle power plant of claim 11, wherein the fuel supply system further comprises a storage tank disposed on the fuel supply line upstream from the supply tank, wherein the storage tank is sized to receive the liquid ammonia fuel therein.

18. A method of supplying a liquid ammonia fuel to a rotary machine, the method comprising:

channeling the liquid ammonia fuel into a supply tank;

heating the liquid ammonia fuel in the supply tank to thereby increase an ammonia vapor pressure in the supply tank; and, driving the liquid ammonia fuel from the supply tank towards a combustor of the rotary machine using the ammonia vapor pressure in the supply tank.

19. The method of claim 18, further comprising:

driving the liquid ammonia fuel to the combustor using a fuel pump when the ammonia vapor pressure in the supply tank is at a first pressure;

heating the liquid ammonia fuel in the supply tank to increase the ammonia vapor pressure in the supply tank from the first pressure to a second pressure; and, when the ammonia vapor pressure in the supply tank is at the second pressure, the driving of the liquid ammonia fuel from the supply tank towards the combustor of the rotary machine using the ammonia vapor pressure in the supply tank occurs by selectively bypassing the fuel pump.

20. The method of claim 18, further comprising heating the liquid ammonia fuel in the supply tank using one of exhaust gases generated by the rotary machine and steam generated downstream from the rotary machine.

* * * * *